United States Patent
Schmitt et al.

(10) Patent No.: US 8,761,796 B2
(45) Date of Patent: Jun. 24, 2014

(54) SPATIAL ARRANGEMENT OF A PLURALITY OF COMMUNICATION DEVICES AND METHOD FOR DETERMINING THE SPATIAL POSITION OF A DEVICE

(75) Inventors: Johannes Schmitt, Darmstadt (DE);
Andreas Reinhardt, Darmstadt (DE);
Matthias Kropff, Darmstadt (DE)

(73) Assignee: Unify GmbH & Co. KG, München (DE)

( * ) Notice: Subject to any disclaimer, the term of this patent is extended or adjusted under 35 U.S.C. 154(b) by 0 days.

(21) Appl. No.: 13/696,152

(22) PCT Filed: May 7, 2010

(86) PCT No.: PCT/EP2010/002835
§ 371 (c)(1),
(2), (4) Date: Dec. 6, 2012

(87) PCT Pub. No.: WO2011/137920
PCT Pub. Date: Nov. 10, 2011

(65) Prior Publication Data
US 2013/0084889 A1    Apr. 4, 2013

(51) Int. Cl.
*H04M 11/04* (2006.01)
(52) U.S. Cl.
USPC ..................................... 455/456.1; 455/404.2
(58) Field of Classification Search
CPC .............. H04B 7/04; H04B 7/06; H04B 7/08; H04B 7/10; H04W 16/28; H04W 4/00
USPC .................. 455/456.1–456.5, 404.2; 340/989
See application file for complete search history.

(56) References Cited

U.S. PATENT DOCUMENTS 8,331,952 B2 *  12/2012 Pagonis et al. ............. 455/456.1
2007/0014252 A1   1/2007 Chung et al.
(Continued)

FOREIGN PATENT DOCUMENTS

CN    101644777 A    2/2010
WO    03101139 A1   12/2003

OTHER PUBLICATIONS

International Search Report for PCT/EP2010/002835 dated Mar. 14, 2011 (Form PCT/ISA/210) (German Translation).
(Continued)

*Primary Examiner* — Nizar Sivji
(74) *Attorney, Agent, or Firm* — Buchanan Ingersoll & Rooney PC

(57) ABSTRACT

In order to determine the spatial position of a device (D), the device receives position data relating to a plurality of transmitters (T1, . . . , Tn) in the area surrounding the device, each of which transmitters emits its own position data in the form of radio signals (PS1, . . . , PSj). The device uses the received position data relating to at least some of these transmitters to determine its own position. The transmitters are parts of a plurality of second communication devices (T1, . . . , Tn) each having at least two radio interfaces (RI1, RI2) of a first type (RI1) and of a second type (RI2) in a network (N) of a plurality of first communication devices (AP1, . . . , APm) each having at least one radio interface of the second type (RI2), wherein the network is switched via the radio interfaces of the second type (RI2). At least some of the first and second communication devices are set up to emit first signals (BS1, . . . , BSk) via the radio interfaces of the second type (RI2).

20 Claims, 4 Drawing Sheets

(56) References Cited

U.S. PATENT DOCUMENTS

2010/0090899 A1    4/2010  Zhao et al.
2011/0317579 A1*  12/2011  Jones et al. .................. 370/252

OTHER PUBLICATIONS

International Search Report for PCT/EP2010/002835 dated Mar. 14, 2011 (Form PCT/ISA/210) (English Translation).

Written Opinion of the International Searching Authority for PCT/EP2010/002835 dated Mar. 14, 2011 (Form PCT/ISA/237) (German Translation).

International Preliminary Report on Patentability and Written Opinion for PCT/EP2010/002835 dated Nov. 13, 2012 (German Translation).

International Preliminary Report on Patentability and Written Opinion for PCT/EP2010/002835 dated Nov. 13, 2012 (English Translation).

* cited by examiner

SPATIAL ARRANGEMENT OF A PLURALITY OF COMMUNICATION DEVICES AND METHOD FOR DETERMINING THE SPATIAL POSITION OF A DEVICE

CROSS REFERENCE TO RELATED APPLICATIONS

This the United States National Phase under 35 U.S.C. §371 of PCT international no. PCT/EP2010/002835, filed on May 7, 2010.

BACKGROUND OF THE INVENTION

1. Field of the Invention

Embodiments of the invention relate to determination of the multiple wireless devices.

2. Background of the Related Art

The determination of the current position of devices or goods plays an increasingly important role in different areas of technology. Examples of such applications are the tracking of parcels on their delivery route or the forwarding of telephone calls depending on the whereabouts of the call recipient. Further examples are known to the person skilled in the art. Known methods for position determination are based on different technical foundations. On the basis of the Global Positioning System (GPS), there are methods for estimating positions which are used in many areas today but are associated with inaccuracies in dense urban environments. The deviations or inaccuracies thus occurring are in the range between 0.1 and 10 m.

Height estimates using GPS receivers are subject to similar limitations of accuracy, whereby position determinations based on the Global Positioning System are too inaccurate in some applications. Moreover, a position determination based on the Global Positioning System requires a line of sight to some of the satellites used, thus frequently making this method unusable within enclosed spaces.

A further method for position determination is based on an analysis of radio cells, for example in the GSM radio network. Mobile telephones according to the GSM standard register with a base station, with the mobile radio network and its operator being informed of the way in which the mobile telephone can be reached. On condition of a sufficient spatial density of such base stations, it is thus possible to a make a position determination of mobile telephones by means of so-called triangulation methods.

In rural areas, however, the density of the base stations is frequently too low for performing such methods. In this respect, walls of buildings also usually have a disruptive effect on the accuracy with which position determinations are possible. Furthermore, the multipath propagation in urban environments, in which the electromagnetic waves are reflected by walls a number of times, makes a position determination in such environments significantly more difficult.

The position determination using wireless networks, such as by means of so-called Wireless Local Area Networks, is subject to similar limitations. In this respect, such networks are predominantly available within buildings or in the vicinity of buildings, and they are subject to similar limitations due to the propagation characteristics of the radio waves used, like the mobile radio networks already mentioned, although they are operated in different frequency ranges.

Radio technologies with even shorter ranges, such as ad hoc radio networks based on the so-called Bluetooth standard, which achieve ranges between a few meters and up to 100 m depending on the class used, in some cases enable fairly accurate estimates of the position, especially if several Bluetooth devices are arranged within the radio range.

Methods for position determination based on ultrasound or infrared radio beacons reach technical limits due to the inability of such waves to penetrate building walls. Within individual rooms, however, such methods provide possibilities for position determination.

Finally, proposals to distribute data to a multitude of radio channels have become known, the intention being to enable the calculation of the distance of a transmitter due to the different arrivals times of the signals. In practice, however, such proposals have not been implemented to date because the radio technology required for this has not yet been developed.

BRIEF SUMMARY OF THE INVENTION

According to embodiments of the invention, a spatial arrangement of a plurality of second communication devices each having at least two radio interfaces of a first type and of a second type in a network of a plurality of first communication devices each having at least one radio interface of the second type is provided, wherein the network is switched via the radio interface of the second type. At least some of the first and second communication devices are set up to emit first signals via the radio interfaces of the second type. At least some of the first and second communication devices are set up to receive these first signals and equipped with facilities for estimating their own positions within the spatial arrangement using the received first signals. At least some of the second communication devices are equipped with a device for emitting second signals via the radio interfaces of the at least one first type. The second signals contain an indication of the own positions of the second communication devices emitting them, within the spatial arrangement.

Embodiments may provide a method for determining the spatial position of a device is also provided in which the device receives position data relating to a plurality of transmitters in the area surrounding the device, each of which transmitters emits its own position data in the form of radio signals, and in which the device uses the received position data relating to at least some of these transmitters to determine its own position.

In connection with the description herein a network means any combination of a plurality of communication devices which can exchange messages between themselves via at least one communication interface, preferably via a wireless communication interface. Examples of such nets or networks are so-called Local Area Networks or so-called Wireless Sensor Networks or so-called Wireless Personal Area Networks, preferably according to the IEEE 802.15.4 standard. Further examples of such networks are short-range radio networks such as so-called ad hoc radio networks, for example based on the so-called Bluetooth standard or mobile radio networks, for example according to the GSM standard.

Such networks are based on different communication interfaces. These communication interfaces, preferably radio interfaces, each feature specific signal encoding methods and specific radio frequency bands. Examples of such radio interfaces are the radio interfaces of the mobile radio standards, for example of the GSM standard or the radio interfaces of the Wireless Personal Area Networks according to the IEEE 802.15.4 standard or of ad hoc networks according to the Bluetooth standard.

In connection with the description herein a first communication device means any type of communication device suitable for establishing a network within the meaning described above. Preferred embodiments of such first communication devices are so-called access points of so-called Wireless Local Area Networks which are known to the person skilled in the art in large numbers and in different embodiments. In connection with the description of the present invention, a second communication device means a communication device having at least two radio interfaces within the meaning described above. Preferred examples of such second communication devices are so-called tubicles, which use at least two radio interfaces and for this purpose are equipped with at least two radio devices interconnected via a central processor unit. Examples of such tubicles are described in the publication "Tubicles: Heterogeneous Wireless Sensor Nodes", Technical Report KOM-TR-2008-09 by Darmstadt Technical University.

According to a preferred execution example of an embodiment of the invention, the network is connected with a server which comprises a facility to support the estimating of the positions of the second communication devices.

According to a further preferred execution example of an embodiment of the invention, at least some of the second communication devices comprise a facility for forwarding the received first signals together with a measure for the strength of the respective reception signal to the server.

According to a further preferred execution example of an embodiment of the invention, at least some of the second communication devices comprise a facility for storing the received first signals together with measure for the strength of the respective reception signal.

According to a further execution example of the invention, the facility for estimating the own position within the spatial arrangement using the received first signals is equipped to perform a triangulation for estimating the own position.

According to a further preferred execution example of the invention, the second communication devices feature a processor facility and at least two radio facilities, and the processor facility controls the at least two radio facilities.

According to a further preferred embodiment of the invention, a third communication device with a radio interface of the first type is provided, said communication device being equipped with a facility for determining the own position using the second signals received by this communication device via the radio interface of the first type and emitted by the second communication devices.

In a preferred execution example of a method according to an embodiment of the invention, the plurality of transmitters are second communication devices in an arrangement according to one of the preferred execution examples of embodiments of the present invention. To this end, these second communication devices preferably emit their position data via at least two radio channels. According to a further preferred method according to an embodiment of the invention, the device receives position data relating to the second communication devices via at least two radio channels and ascertains its own position as an average value of the positions determined via the individual radio channels.

According to a further preferred embodiment of a method according to the invention, the second communication devices are arranged in a spatially stationary manner and ascertain their own positions only within an initialisation phase or after a change in their locations.

BRIEF DESCRIPTION OF THE FIGURES

Hereinafter, the invention is described in more detail using preferred execution examples and by means of the figures.

DETAILED DESCRIPTION OF THE INVENTION

Figure 1:
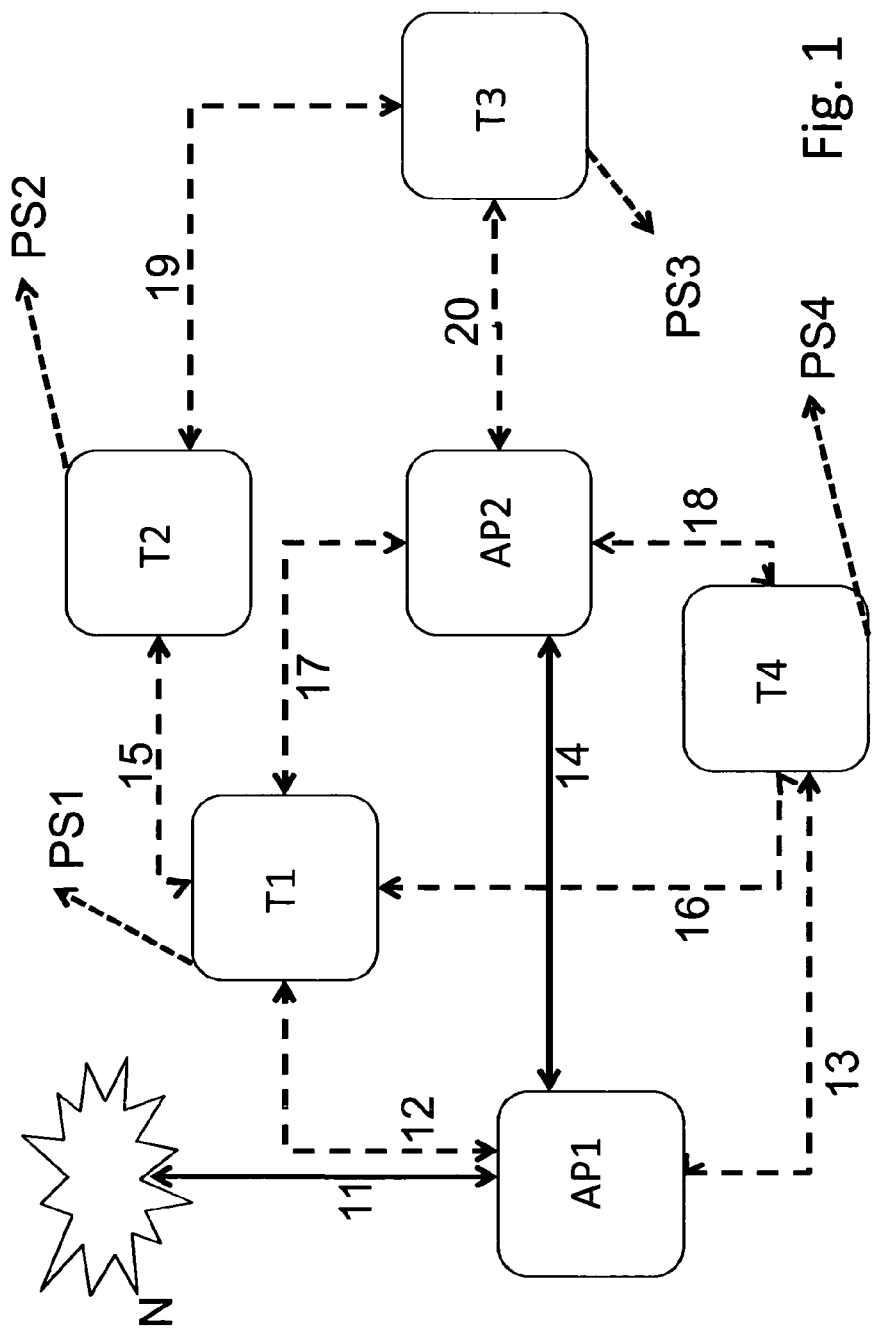
FIG. 1 shows, schematically, an arrangement according to the invention pursuant to a preferred execution example of the invention.

The present invention is based on the basic idea of estimating the position of persons, who carry a communication device, or of objects within enclosed spaces based on a plurality of radio technologies. To this end, the process of estimating is also called localisation or positioning, with these terms being used synonymously hereinafter. Thus, the present invention is particularly advantageous in situations which demand a small absolute error during position determination. As buildings frequently consist of several stories a method preferably enables a location determination and position determination in three dimensions. The method also prefers the use of a heterogeneous environment of communication devices which preferably contains Bluetooth-enabled mobile telephones, WLAN-enabled notebook computers and/or small inexpensive embedded sensor nodes, such as those sensor nodes used in connection with logistic infrastructure objects.

The most accurate knowledge of the position of an object can be advantageous in a wide range of applications. Thus, in normal office environments, several persons frequently share equipment such as labelling devices or other devices needed less frequently which can be placed, by these persons, in a wide range of locations. Other areas of application include manufacturing environments or department stores, in which the current whereabouts of objects needs to be ascertained. Other applications comprise the automatic selection of a mobile telephone profile depending on the current whereabouts of the user of the mobile telephone or the notification of a service technician depending on his/her distance from a machine to be maintained, wherein these applications have in common that the position of a user or of a person must be known as accurately as possible.

According to embodiments of the invention, it is proposed to use, for position determination, radio beacons which are integrated into a radio network and have a plurality of radio interfaces. Preferably, these radio beacons can communicate via the following radio interfaces:

1. The radio interface of the Wireless Local Area Network. Wireless Local Area Networks are local radio networks which normally operate according to the IEEE-802.11 standard. For such networks, the WiFi area is also used in some contexts. In contrast to the Wireless Personal Area Network (WPAN), Wireless Local Area Networks (WLANs) feature greater transmission powers and ranges and generally offer higher data transmission rates. The so-called Orthogonal Frequency Division Multiplex (OFDM) is normally used as the modulation method, said OFDM representing a special implementation of the multi-carrier modulation in which several orthogonal carrier signals are used for digital data transmission.

2. Radio interfaces according to the Bluetooth standard with the beacon mode set to "on". Bluetooth is a standard according to IEEE 802.15.1, developed in the 1990s by the Bluetooth Special Interest Group, for the radio transmission between devices over a short distance (Wireless Personal Area Networks). The Bluetooth standard thus enables both wireless and wired transmissions from point to point and so-called ad hoc networks.
3. The radio interface of the Wireless Personal Area Network according to the IEEE 802.15.4 standard enables, similar to Bluetooth, the establishing of short-range Wireless Personal Area Networks with inexpensive hardware and secure transmission.

For each radio interface to be supported, a corresponding radio facility is integrated into the second communication devices, for example into the tubicles. These second communication devices, preferably tubicles, are integrated into an existing Wireless Local Area Network infrastructure of access points. In this manner, an existing WLAN infrastructure can be used for the position determination, in addition to its actual task of providing a wireless local area network. Preferably, the second communication devices have three radio interfaces. A first radio interface corresponds to the radio interface of the WLAN standard, a second one corresponds to the Bluetooth standard, and a third one to the IEEE 802.15.4 standard. The second communication devices, in this infrastructure, have the task of connecting, as terminals (client devices) with the existing WLAN infrastructure. The tubicles can easily manage this task due the existing WLAN interface. Using this radio interface, the tubicles observe the data traffic on the WLAN and register beacon signals which can originate both from access points and from tubicles. Preferably, all beacon signals received are stored in a data structure (array of tuples) which, preferably, contain the beacon transmitters observed and their signal strengths.

The existing WLAN infrastructure is preferably used by the tubicles, with the aid of the WLAN interface, to establish a connection to a server located in the internet or in the intranet (mapping server) which can deduce a position within the building equipped with the WLAN based on the data structures which, preferably, contains the beacon transmitters observed and their corresponding signal strengths.

After the position has been ascertained, the tubicle itself emits beacon signals in a broadcast mode transmitting the own physical address (BSSID, "basic service set identifier") of the radio transmission facility and the determined position of the node, preferably in absolute coordinates or in a coordinate system of the building used. Preferably, the position is transmitted in addition to the physical address. Based on existing technical standards, this can for example be achieved by the WLAN sending beacons with an extended address (ESSID, "extended service set identifier") which contains encoded position information.

In addition, this position information is also transmitted in the broadcast mode via the other integrated radio transmission facilities and their radio interfaces. Thus, preferably, via the Bluetooth interface and the interface according to the IEEE 802.15.4 standard. Similar to the transmission via the WLAN interface, the position can be embedded in the ESSID of the Bluetooth beacon. Other protocols, such as the protocol according to the IEEE 802.15.4 standard, can be easily extended by a format which can contain position information.

The second communication devices, thus preferably the tubicles, are devices with a plurality of radio interfaces which contain a corresponding plurality of radio facilities (transceivers) and a control facility for their control. The control facility manages and controls the radio facilities and also performs the localisation of the tubicle itself, wherein it utilises the support of an external mapping database.

The position determination of communication devices can thus be performed in the following manners. Mobile WLAN-enabled devices can connect with existing WLAN access points and utilise the support of the mapping database, providing that the network administrator does not prevent this for security reasons. Additionally, or alternatively to this, mobile WLAN-enabled devices can listen to network beacons which can be emitted both by existing WLAN access points and by tubicles and thus use the information for determining their own positions which, in the form of ESSIDs, are embedded into the signals. An ESSID thus means a so-called radio network name by means of which different Wireless Local Area Networks can be operated at the same location. The Basic Service Set Identifier (BSSID) is the unique designation of an access point in a WLAN. The IEEE 802.11-1999 Wireless LAN specification defines a BSSID as the MAC address of a station of an access point in the infrastructure mode. The BSSID thus uniquely identifies each Wireless Access Point, which is required especially in order to distinguish access points with an identical ESSID.

Another possibility for position determination which, however, can also be combined with the ones previously named, is to use Bluetooth-enabled devices such as mobile telephones for listening to the Bluetooth beacons broadcast, on the radio channel, by the tubicles. This does not require establishing a connection, which might be too time-consuming for a fast localisation as the entire localisation information is contained in the character string of the ESSID. The position can then be estimated based on a triangulation.

Another possibility which, however, can also be combined with the possibilities mentioned previously, is that mobile devices supporting the IEEE 802.15.4 standard, such as transport containers equipped with a sensor or parcels, could determine their positions in an analogue manner, such as previously described for the Bluetooth standard.

Moreover, devices with a plurality of the aforementioned radio interfaces can effect a localisation by finally averaging the localisation ascertained by using individual radio interfaces in order to thus determine an improved, possibly more accurate position by means of averaging using different values.

To further improve the accuracy of position determination and, in particular, to also effectively support the position determination in three dimensions, the previously described tubicles or corresponding second communication devices can be deployed as a fine-grained grid in the spatial area used. In buildings, tubicles could be advantageously implemented as luminaries (light boards), wall power outlets or electric appliances commonly found in households.

Compared with existing methods for position determination or for localisation, the invention described offers, due to the hybrid technology described which includes the use of a plurality of radio interfaces and corresponding gateway nodes which autonomously determine their positions before they emit them in the broadcast mode, a more flexible solution for position determination than methods which are based on only one radio medium because, according to the present invention, a multitude of devices with different radio communication protocols and radio interfaces can avail themselves of the system.

The accuracy of the localisation can also be increased by the tubicle nodes enabling an improved, more finely distributed resolution of the spatial zone viewed. In particular, coordinates can be transferred in three dimensions, which supports a positioning in three dimensions. According to a preferred embodiment of the invention, the data exchange can be limited to the transport of datasets with information via the positions between neighbouring WLAN nodes, whereby the localisation is performed in a distributed manner and through the nodes which want to determine their own positions. The transport of datasets to the mapping server and the associated data traffic volume can preferably be limited to the initialisation phase, so that a strain on the network can thus be avoided.

Figure 4:
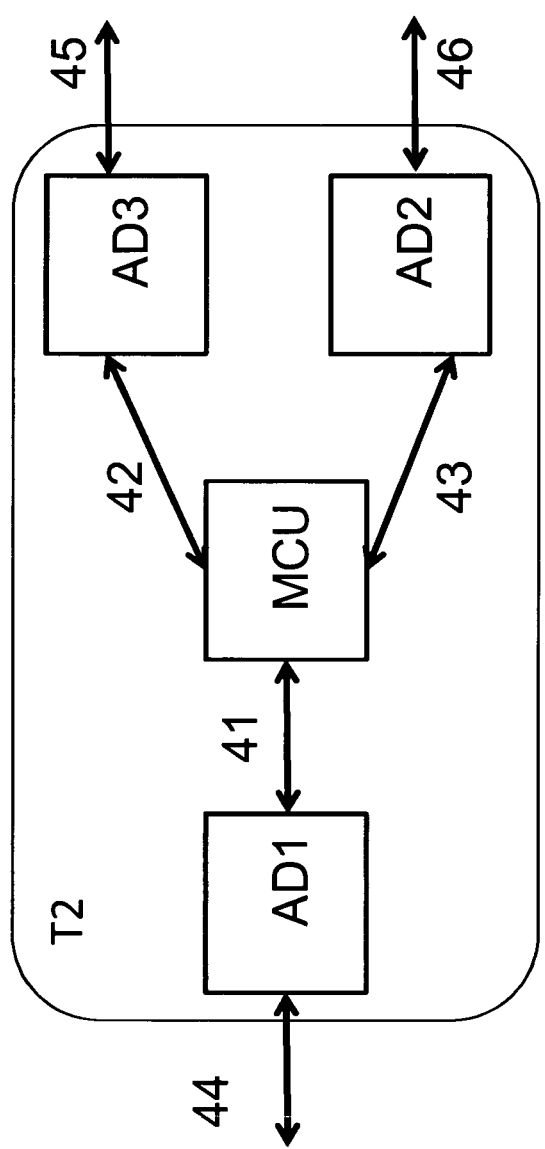
FIG. 4 shows, schematically, a second communication device pursuant to a preferred execution example of the invention.

In the context of the description of embodiments of the present invention, the acronyms and reference numbers below are used:

API, ..., APm first communication devices
T1, ..., Tn second communication devices, transmitters
RI1 radio interfaces of a first type
RI2 radio interfaces of a second type
N network
BS1, ..., BSk first signals
PS1, ..., PSj second signals
DB facility for supporting the estimating of the positions of the second communication devices
AD1, ..., AD3 radio facilities
D third communication device
IRs entries in a database
11 to 25 signals between communication devices
MCU processor unit for controlling radio devices
41 to 46 signals of the third communication devices As represented schematically in FIG. 1 using a preferred execution example of the invention, the invention can be realised in the form of a spatial arrangement of a plurality of second communication devices (T1, ..., Tn) each having at least two radio interfaces (RI1, RI2) of a first type (RI1) and of a second type (RI2) in a network (N) of a plurality of first communication devices AP1, ..., APm each having at least one radio interface of the second type RI2, wherein the network is switched via the radio interfaces of the second type RI2. The first communication devices are preferably access points of a wireless local network, of a so-called Wireless Local Area Network. The second communication devices are preferably so-called tubicles, as for example schematically shown in FIG. 4.

At least some of the first and second communication devices are set up to emit first signals BS1, ..., BSk, for example so-called "beacon signals", via the radio interfaces of the second type RI2. At least some of the first and/or second communication devices are set up to receive these first signals and equipped with facilities for estimating their own positions within the spatial arrangement using the received first signals. Thus, the first signals are preferably broadcast via the radio connections 12, 13, 15, 16, 17, 18, 19, 20 or via other radio connections. These signals are preferably directed to all devices in the area surrounding the devices emitting these signals ("broadcast mode"), which can receive these signals. The connection 11 represents the connection of the network N to an external network, preferably to the intranet or to the internet. The connection 14 represents a connection of the access points amongst each other, which is preferably switched via the radio interface RI2 of the second type.

At least some of the second communication devices are equipped with a device for emitting second signals PS1, ..., PS via the radio interfaces of the at least one first type RI1. The second signals PS1, ..., PSj contain an indication of the own positions of the second communication devices T1, ..., Tn emitting them, within the spatial arrangement. These second signals are preferably emitted via one of the radio interfaces RI1 of the first type.

To determine the spatial position of a device D, the device receives position data relating to a plurality of transmitters T1, ..., Tn in the area surrounding the device, each of which transmitters emits its own position data in the form of radio signals PS1, ..., PSj. The device D uses the received position data relating to at least some of these transmitters to determine its own position. The transmitters are parts of a plurality of second communication devices T1, ..., Tn each having at least two radio interfaces RI1, RI2 of a first type RI1 and of a second type RI2 in a network N of a plurality of first communication devices AP1, ..., APm each having at least one radio interface of the second type RI2, wherein the network is switched via the radio interfaces of the second type RI2. At least some of the first and second communication devices are equipped to emit first signals BS1, ..., BSk via the radio interfaces of the second type RI2. At least some of the first and/or second communication devices are set up to receive these first signals and equipped with facilities for estimating their own positions within the spatial arrangement using the received first signals. At least some of the second communication devices are equipped with a device for emitting second signals PS1, ..., PSj via the radio interfaces of the at least one first type RI1. The second signals PS1, ..., PSj contain an indication of the own positions of the second communication devices T1, ..., Tn emitting them, within the spatial arrangement.

Figure 2:
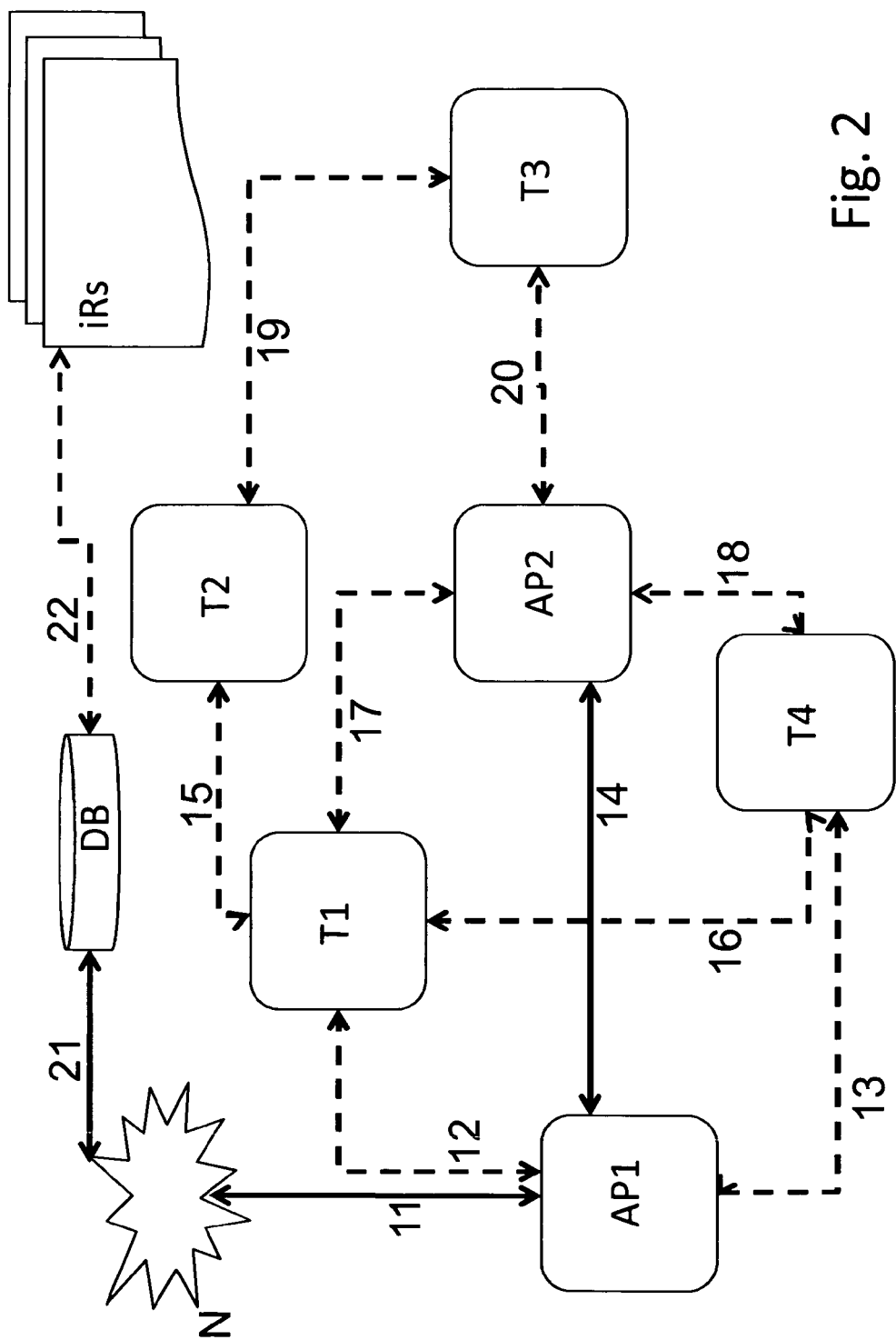
FIG. 2 shows, schematically, an arrangement according to the invention pursuant to a further preferred execution example of the invention.

As schematically shown in FIG. 2 using a preferred execution example, the first and/or second communication devices can access a server, preferably via the intranet or via the internet, for example a "mapping server" which is connected with a database DB. The position determination of the communication devices can be supported by means of this access. The database DB preferably also contains, as entries, so-called "information records" (IRs) by means of which the position determination of the communication devices can be supported. These can preferably be estimated values for the positions of individual communication devices which, having been ascertained, are transmitted to the server and are preferably constantly updated in its database DB. This for example enables the determination, from initially less accurate position estimates, of more accurate positions in the further course of the method, step by step. In addition to the current estimated values for the positions, the information records (IRs) can also comprise accuracy estimates of the position estimates so that an optimum weighting of the individual position values is possible when they are used for an improved estimate.

Figure 3:
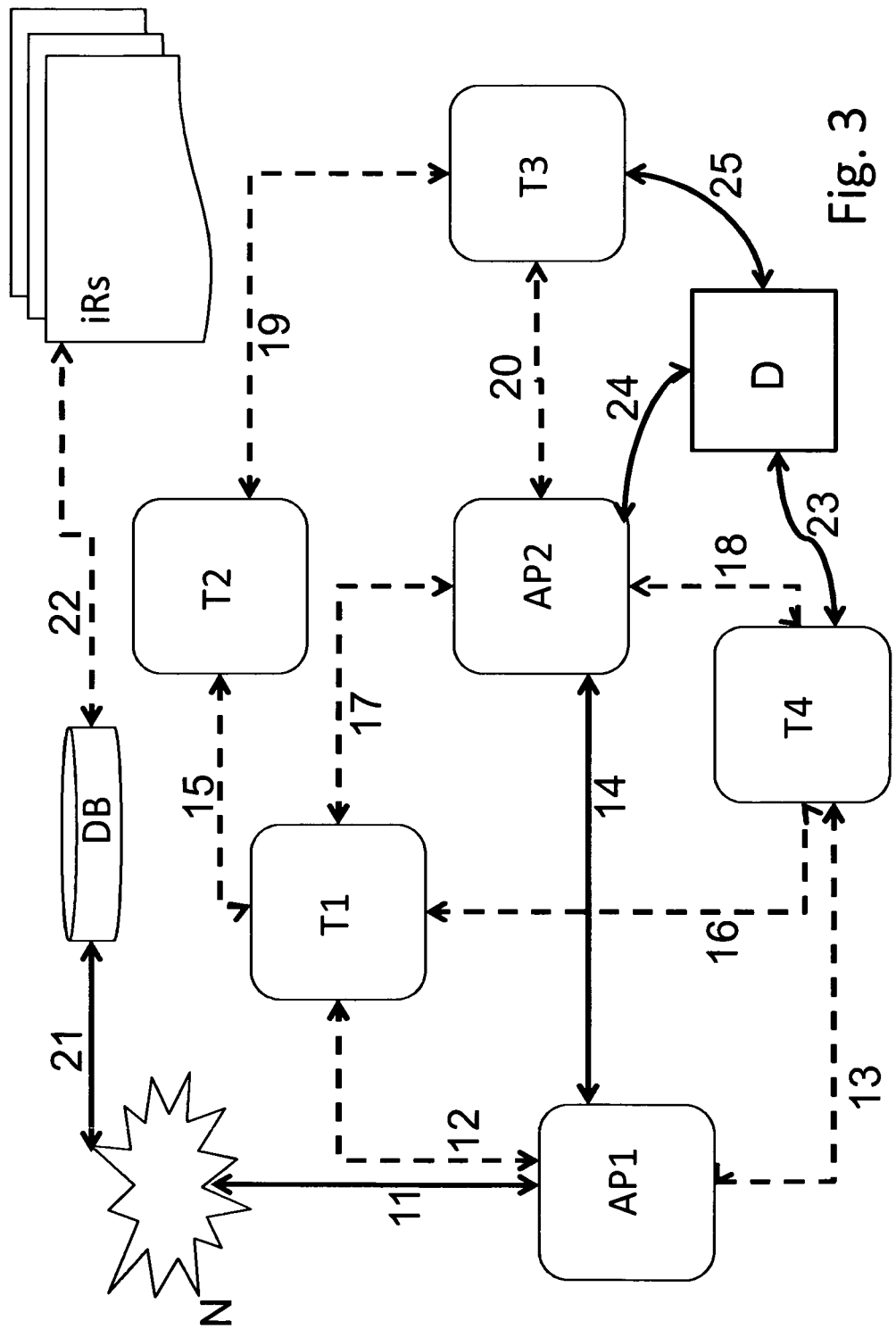
FIG. 3 shows, schematically, an arrangement according to the invention pursuant to a further preferred execution example of the invention.

A device D which, for example, can be a communication device carried by a human user or carrier such as a mobile telephone, navigation device or similar or which can be attached to an object such as a parcel or shipment, now preferably obtains, as schematically shown in FIG. 3 using a preferred execution example, position information 23, 24, 25 relating to at least one of the first and or second communication devices AP2, T3, T4 and ascertains its own position using the received position data. Depending on the availability of the data and depending on the required accuracy, this can be effected in different ways, for example by an interpolation or by a triangulation or by any suitable method for position determination, i.e. for determining the own position, from the received position data of the first and/or second communication devices surrounding the device.

The invention claimed is:

1. A spatial arrangement of communication devices comprising:
  a plurality of second communication devices each having at least two radio interfaces of a first type and of a second type in a network of a plurality of first communication devices each having at least one interface of the second type, wherein the network is switched via the radio interfaces of the second type and wherein the first type is different from the second type, and wherein:
- at least some of the first and second communication devices are set up to emit first signals via the radio interfaces of the second type,
- at least some of the first and second communication devices are set up to receive these first signals and equipped with facilities for estimating their own positions within the spatial arrangement using the first signals received, and
- at least some of the second communication devices are equipped with a device for emitting second signals via the radio interfaces of the first type, and wherein
- the second signals contain an indication of their own positions of the second communication devices emitting them, within the spatial arrangement, the indication of their own positions being information based on the estimating of their own positions within the spatial arrangement made using the first signals received by those second communication devices.

2. The arrangement of claim 1, further comprising a server connected to the network, said server comprising a facility to support estimating of the positions of the second communication devices.

3. The arrangement of claim 2, wherein at least some of the second communication devices comprise a facility for forwarding the received first signals together with a measure of the strength of the respective reception signal to the server.

4. The arrangement of claim 1, wherein at least some of the second communication devices comprise a facility for storing the received first signals together with a measure of the strength of the respective reception signal.

5. The arrangement of claim 1, wherein the facility for estimating the own position within the spatial arrangement using the received first signals is equipped to perform a triangulation for estimating the own position.

6. The arrangement of claim 1, further comprising the second communication devices including a processor facility and at least two radio facilities wherein the processor facility controls the at least two radio facilities.

7. The arrangement of claim 1, further comprising at least one third communication device with a radio interface of the first type which is equipped with a facility for determining the own position using the second signals received by the third t communication device via the radio interface of the first type and emitted by second communication devices.

8. The arrangement of claim 1, further comprising:
a device configured to receive position data relating to the second communication devices via at least two radio channels and ascertain its own position as an average value of the positions determined via the individual radio channels.

9. The arrangement of claim 1, wherein the first signals are beacon signals that are broadcast to an area surrounding the first and second communication devices emitting the first signals; the second communication devices are comprised of tubicles deployed in a grid within a building such that a device receiving at least one of the first signals and at least one of the second signals via at least two radio channels within the building ascertains a three dimensional position of the device within the building using data from the received first and second signals.

10. A method for determining the spatial position of a device comprising:
- receiving, by the device, device position data relating to a plurality of transmitters in the area surrounding the device;
- emitting, by each of said plurality of transmitters its own position data in the form of radio signals; and
- via the received position data relating to at least some of these transmitters, determining the position of the device;
- wherein the plurality of transmitters are second communication devices in an arrangement such that each having at least two radio interfaces of a first type and of a second type in a network of a plurality of first communication devices each having at least one interface of the second type wherein the network is switched via the radio interfaces of the second type, and wherein:
- at least some of the first and second communication devices are set up to emit first signals via the radio interfaces of the second type;
- at least some of the first and second communication devices are set up to receive these first signals and equipped with facilities for estimating their own positions within the spatial arrangement using the first signals received; and
- at least some of the second communication devices are equipped with a device for emitting second signals via the radio interfaces of the at least one first type; and
- wherein the second signals contain an indication of their own positions of the second communication devices emitting them, within the spatial arrangement; and
- wherein the second communication devices emit their position data via at least two radio channels; and
- wherein the device receives position data relating to the second communication devices via at least two radio channels and ascertains its own position as an average value of the positions determined via the individual radio channels.

11. The method of claim 10, wherein the second communication devices are spatially stationary and only ascertain their own positions within an initialisation phase or after a change in their locations.

12. The method of claim 10, wherein the first communication devices are access points.

13. The method of claim 10, wherein the second communication devices are tubicles.

14. The method of claim 10, wherein the first signals are beacon signals.

15. The method of claim 10, wherein the device is a communication device, a mobile telephone, or a navigation device.

16. The method of claim 10, wherein the spatial arrangement is a network, a wireless network, a local area network, or a wireless local area network.

17. The method of claim 10, wherein the device is a communication device that is attached to a parcel.

18. The arrangement of claim 8, wherein the second communication devices are tubicles and the first communication devices are access points.

19. The arrangement of claim 18, wherein the device is configured to receive position data relating to the second communication devices via at least two radio channels and ascertain its own position as an average value of the positions determined via the individual radio channels is attached to a parcel.

20. The arrangement of claim 18, wherein the device is configured to receive position data relating to the second communication devices via at least two radio channels and ascertain its own position as an average value of the positions determined via the individual radio channels is is a mobile communication device.

\* \* \* \* \*